June 27, 1944.  F. K. VIAL  2,352,237

CAST ARTICLE AND METHOD OF MAKING

Filed April 1, 1940  8 Sheets-Sheet 1

INVENTOR.
Frederick K. Vial,
BY
ATTORNEY.

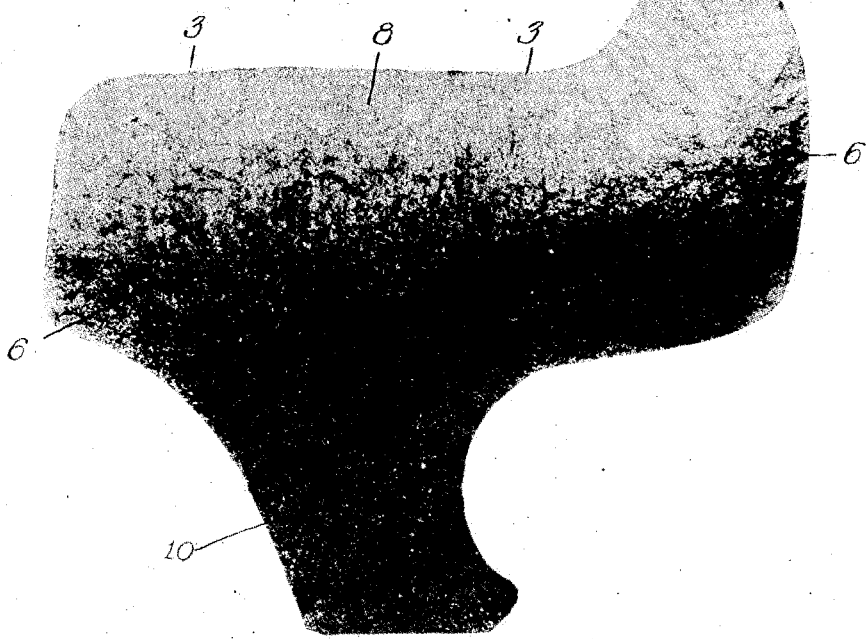
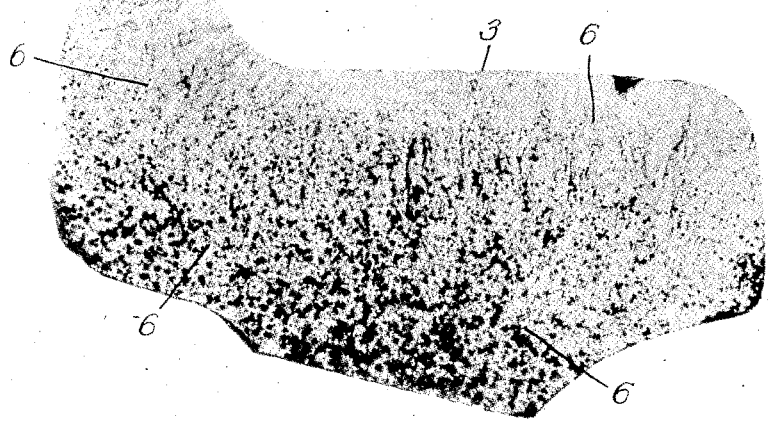

Patented June 27, 1944

2,352,237

UNITED STATES PATENT OFFICE 2,352,237

CAST ARTICLE AND METHOD OF MAKING

Frederick K. Vial, Chicago, Ill., assignor to Griffin Wheel Company, Chicago, Ill., a corporation of Massachusetts Application April 1, 1940, Serial No. 327,207

14 Claims. (Cl. 75—130)

My invention relates to a cast iron article and the method of making it. For the purpose of illustration a cast iron car wheel is used but my method is equally applicable to any cast iron article in which it is desired to produce a hardened zone as contrasted with other portions of the article in which it is desired to retain other qualities, particularly ductility and resistance to shock, normally present in unchilled iron. Another example of such a cast iron structure would be a gear wheel.

Cast iron is an iron-carbon-silicon alloy in which the carbon may range from two to four percent and the silicon above 0.25 percent in combination with varying percentages of manganese, sulphur, phosphorus and sometimes with one or more special alloys as, for example, nickel, chromium, molybdenum, vanadium, titanium or others. The iron as cast is not malleable.

There are three general types of cast iron, namely; gray iron, chilled iron and white iron. A gray iron casting is the usual form of cast iron in which the carbon combined with the iron is generally less than 0.85 percent. A chilled iron casting is one in which some section has been purposely cooled so rapidly by means of a chiller in the mold that the carbon in that part is practically all in the combined state while other sections which have cooled naturally are gray iron. Between the chilled portion and the gray iron portion lies a region of mottled iron so-called. The chilled iron may be defined as that zone of a chilled casting in which practically all the carbon is in the combined state and hence contains negligible quantities of graphite. The zone between the chilled iron and the gray iron is commonly described as mottled iron and it comprises all the grades of cast iron in which the percentage of combined carbon ranges between approximately 0.85 percent and the percentage of total carbon which may range to three and one-half or four percent.

A white iron casting is one in which the fracture is described as white throughout and as such contains practically no graphite. Such a result is obtained by compositional control without reference to a rapid cooling agency and with this particular type of iron we are not concerned in this invention.

A chilled car wheel in its various parts is composed of three types of iron, namely; chilled iron, mottled iron, and gray iron as above described. The distribution of these diversified irons which have widely varying properties is illustrated in the accompanying figures. A relatively thin band of chilled iron extends around the circumference of the cast wheel and forms the wearing surface. This chilled metal is an alloy of carbon and iron chemically combined in the ratio indicated by the formula $Fe_3C$, commonly known as carbide of iron, or cementite in a matrix of pearlite. Pearlite is a lamellar aggregate of carbides and ferrite. Carbide of iron is as hard as tempered steel, is devoid of ductility, and not so resistant to shock as gray iron. Radially inward from the chilled metal is a more or less extended zone of mottled iron as shown, for example, in the accompanying Figure 1. Mottled iron is composed of a mixture of carbide of iron, pearlite and graphite.

The plate and hub of the wheel are composed of substantially pure gray iron in which the combined carbon is approximately 0.60 percent. Car wheels as ordinarily manufactured contain 3.50 percent total carbon which exists in the various forms above described. The thickness of the chilled iron band is regulated by the chilling process, hence this metal is called chilled iron.

In the molten state the entire carbon content is in the combined form and if cooled suddenly the carbon remains as carbide of iron after solidification, whereas in the part of the casting which is cooled more slowly the carbon in the iron carbide separates from the iron into the graphitic form. Inasmuch as there is a rapid decrease in the rate of cooling through the transformation range from the chilled surface towards the interior of the casting, there is a corresponding gradient of carbide of iron decomposition (Figure 1). In the numerous chemical combinations of molten iron there is a comparatively wide range with respect to the sensitivity of carbide stabilization and carbide decomposition.

The art of the manufacture of chilled iron castings consists in the control to a predetermined depth of the chilled band over that portion of the casting which is designed to be hardened for some special purpose or function.

The railroad car wheel may be taken as an example of a chilled casting. The Association of American Railroads specifies that the minimum depth of chill shall be one-half inch, and the maximum one and one-eighth inches. If the band of chilled iron is less in thickness than one-half inch, the wearing quality of the wheel is impaired, and if it is greater than one and one-eighth inches, the factor of safety of the wheel against impacts is reduced.

In the accompanying drawings, Figure 1 is a representative section through a chilled iron car wheel, showing the normal distribution of the chilled iron, mottled iron and gray iron; and Figures 1A, 1B and 1C illustrate the microstructures of the various portions of the chilled wheel.

Figures 2 and 3 are taken from the A. A. R. Wheel and Axle Manual and indicate the range of the permissible minimum and maximum chill depths in the tread portion of the wheel.

Figure 5 is a view of a fracture through the tread portion of a car wheel formed in accordance with my invention, showing clearly the gray iron portion, the chilled iron portion, and the relatively narrow band of mottled iron in which they merge. In this figure the dendritic formation is also evident in the carbide of iron or chilled portion.

Figure 7:
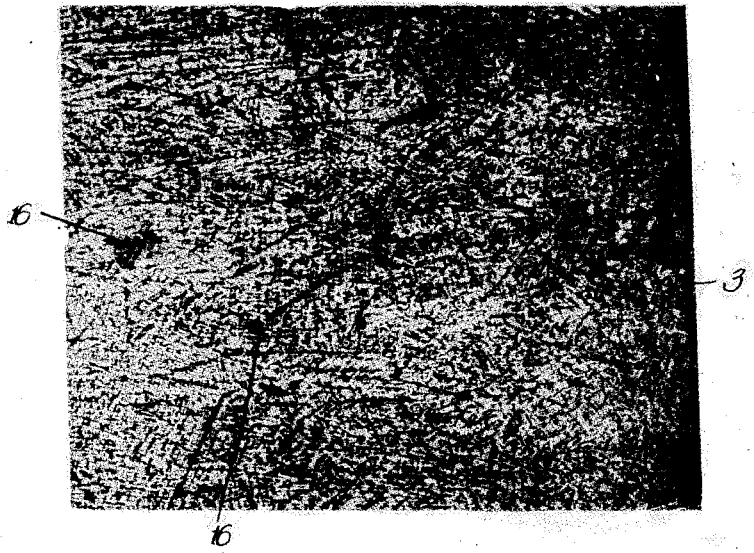
Figure 7 is a macrophotograph, magnified twelve times, of a cut through the tread portion of a wheel made in accordance with my invention and shows by contrast with Figure 6 the clear carbide of iron almost free of graphite.
Figure 8:
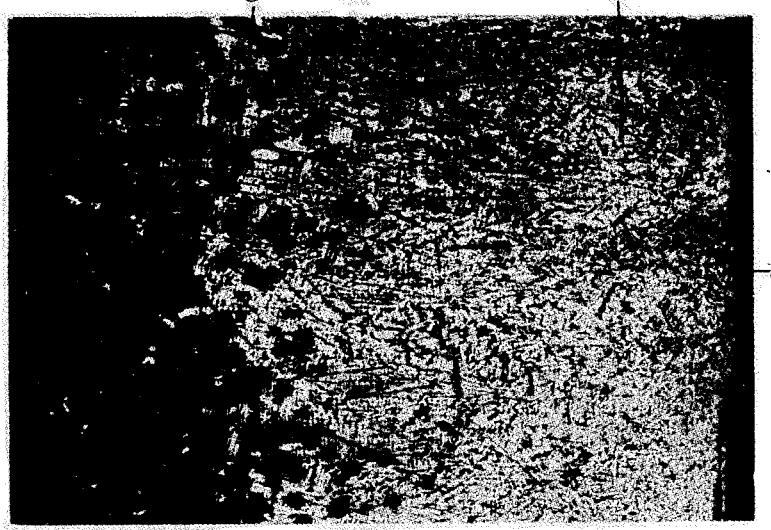

Figure 8 is a macrophotograph, magnified twelve times, of a section through the tread surface of a car wheel subjected to a low chill, that is, a mild chilling operation. This figure is comparable in position and magnification to that of Figures 6 and 7 and shows the relatively sharp line of demarcation between the carbide of iron and the gray iron as practiced in accordance with my invention as compared, for example, with the previous practice as shown in Figures 1, 2, 3 and 6.

Figure 9:
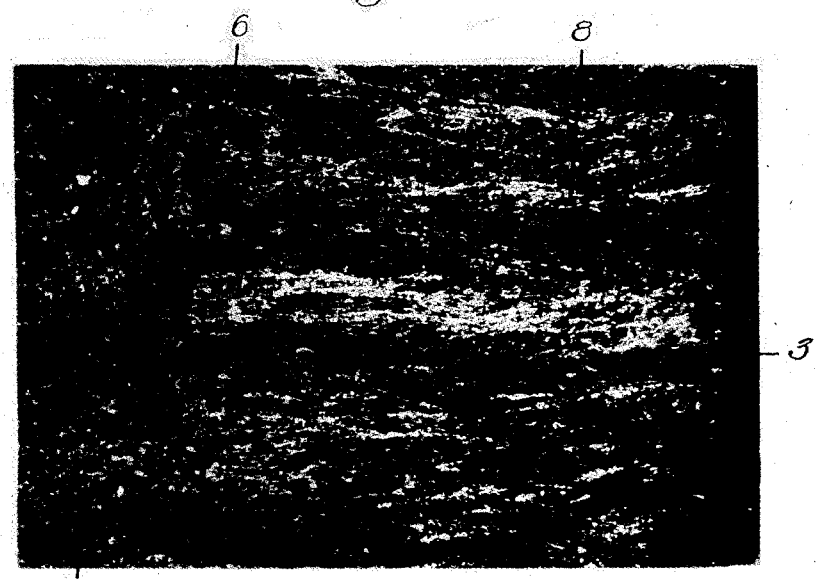

Figure 9 is another macrophotograph, magnified twelve times, of a cut through the tread portion of a car wheel made in accordance with my invention. This figure is also comparable in size and location with Figures 6, 7 and 8 and shows clearly the dendritic structure in the carbide of iron and the termination of the dendrites in the relatively narrow mottled area between the chilled iron and the gray iron.

Figure 10:
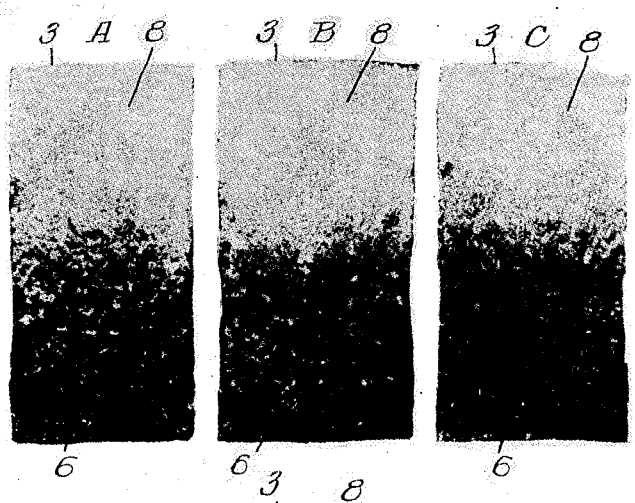

Figure 10 shows photographs of test pieces taken in regular practice and illustrate the manner in which some control is exercised over the amount of chill as further described hereafter.

Figure 11:
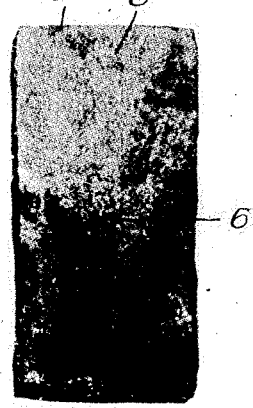

Figure 11 is an illustration comparable with Figure 10 showing a chill test piece taken in accordance with my novel practice.

Figure 12 shows a fracture through the tread portion of a wheel made in accordance with regular practice and illustrates the relative lack of chill control in view of the manner in which the mottled effect is present in greater or less degree substantially throughout the fracture. This figure may be compared with Figure 5 which shows a comparable section through the tread portion of a wheel made in accordance with my invention.

Figure 13:
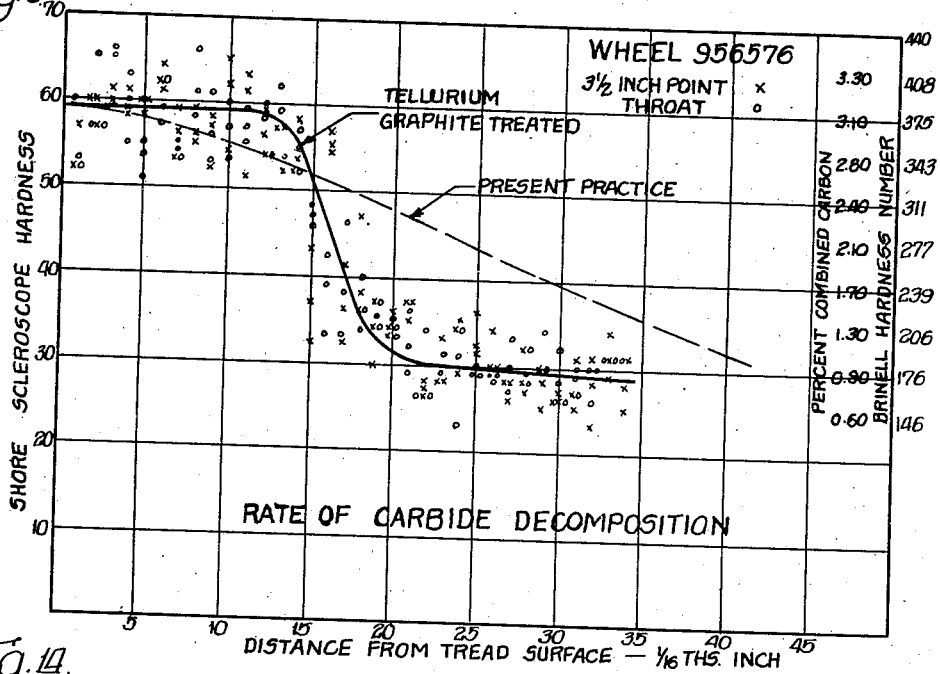

Figure 13 is a graph curve showing the rate of change of hardness and thereby the rate of carbide decomposition progressing inwardly from the surface of the chilled wheel illustrated in Figure 5 and produced in accordance with my invention. For purposes of comparison the broken line superposed upon the graph of Figure 13 represents the curve shown in Figure 14.

Figure 14:
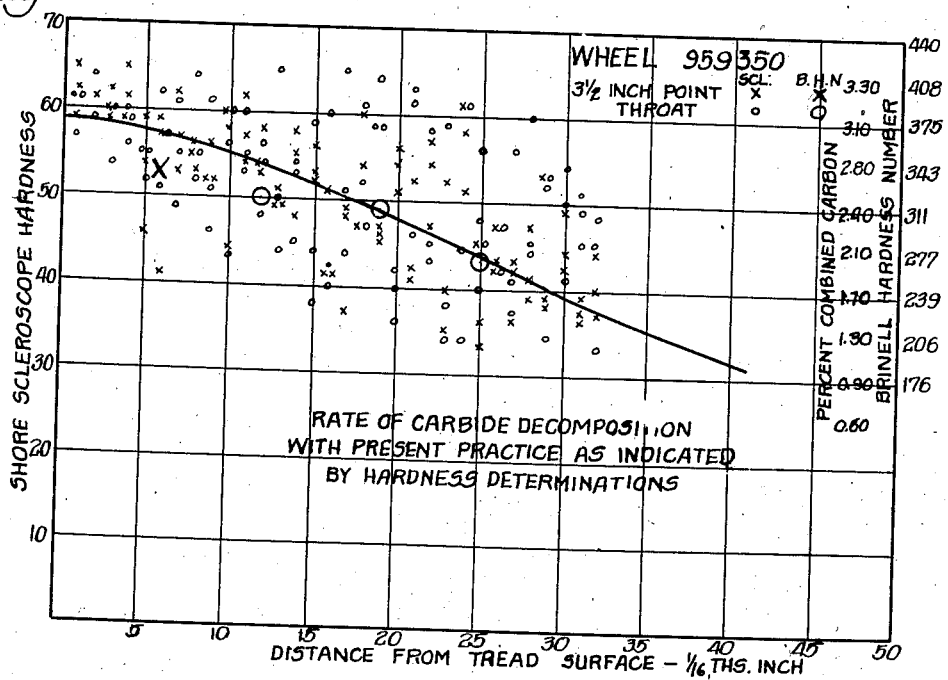

Figure 14 is a chart comparable to Figure 13 but showing the rate of carbide decomposition for the regular practice wheel illustrated in Figure 12. By contrast Figures 13 and 14 clearly illustrate the relatively sharp line of demarcation between the chilled area and the gray iron of the wheel illustrated in Figure 5 as compared with that of the wheel illustrated in Figure 12.

Figure 15:
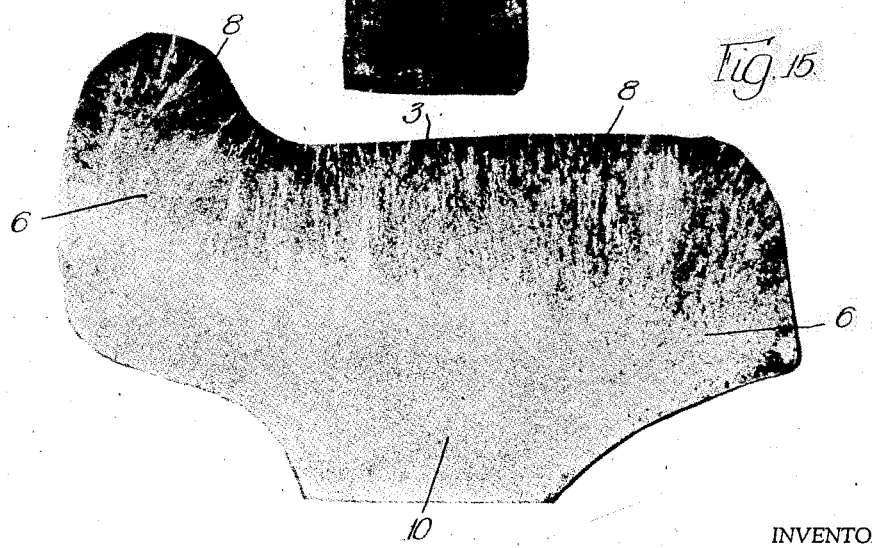

Figure 15 is a photograph of a cut through the tread portion of a wheel made in accordance with my invention and well illustrates the dendritic structure in the carbide of iron portion and the terminat'on thereof in the relatively narrow mottled iron area between the carbide of iron and the gray iron.

In all of the above figures the reference character 3 indicates the chilled surface of the casting, 6 indicates the mottled iron, 8 indicates chilled iron, 10 indicates gray iron, 12 indicates cementitle, 14 indicates pearlite, 16 indicates graphite, and 18 indicates ferrite.

The term "chill" as used in the A. A. R. specification is given no precise definition and hence has no exact application. It will be noted that the character of the chill at the points designated X, X (Figure 2) and Y, Y (Figure 3) is not definite but differs in these two figures. Inasmuch as there has been no definition for the appearance, composition or hardness of the metal which is attempted to be measured, the chill measurements as heretofore practiced have relatively little significance and have resulted in great loss to the industry through the shipment of wheels with insufficient true chill. In the absence of a definite meaning for the word "chill," there is no recourse or check on the inspector's measurements. Inspectors can not agree on chill measurements because the line of demarcation that is being measured is not specific. Measurements therefore become largely a matter of judgment and experience as to whether wheels should be passed or rejected.

Recently an attempt has been made to fix the minimum and maximum limits by instrumental hardness determinations. The limit for the low chill is placed at a point where 0.50 percent of the graphite has separated (Figure 1M) from the chilled iron, and the limit for high chill is placed exper'mentally at a point where 1.00 percent of graphite has formed (Figure 1N). The so-called chill measurements are therefore in the mottled iron and do not accurately fix the depth of the pure chill, neither do they fix the hardness gradient through the tread of the wheel (Figures 12 and 14).

Figure 1:
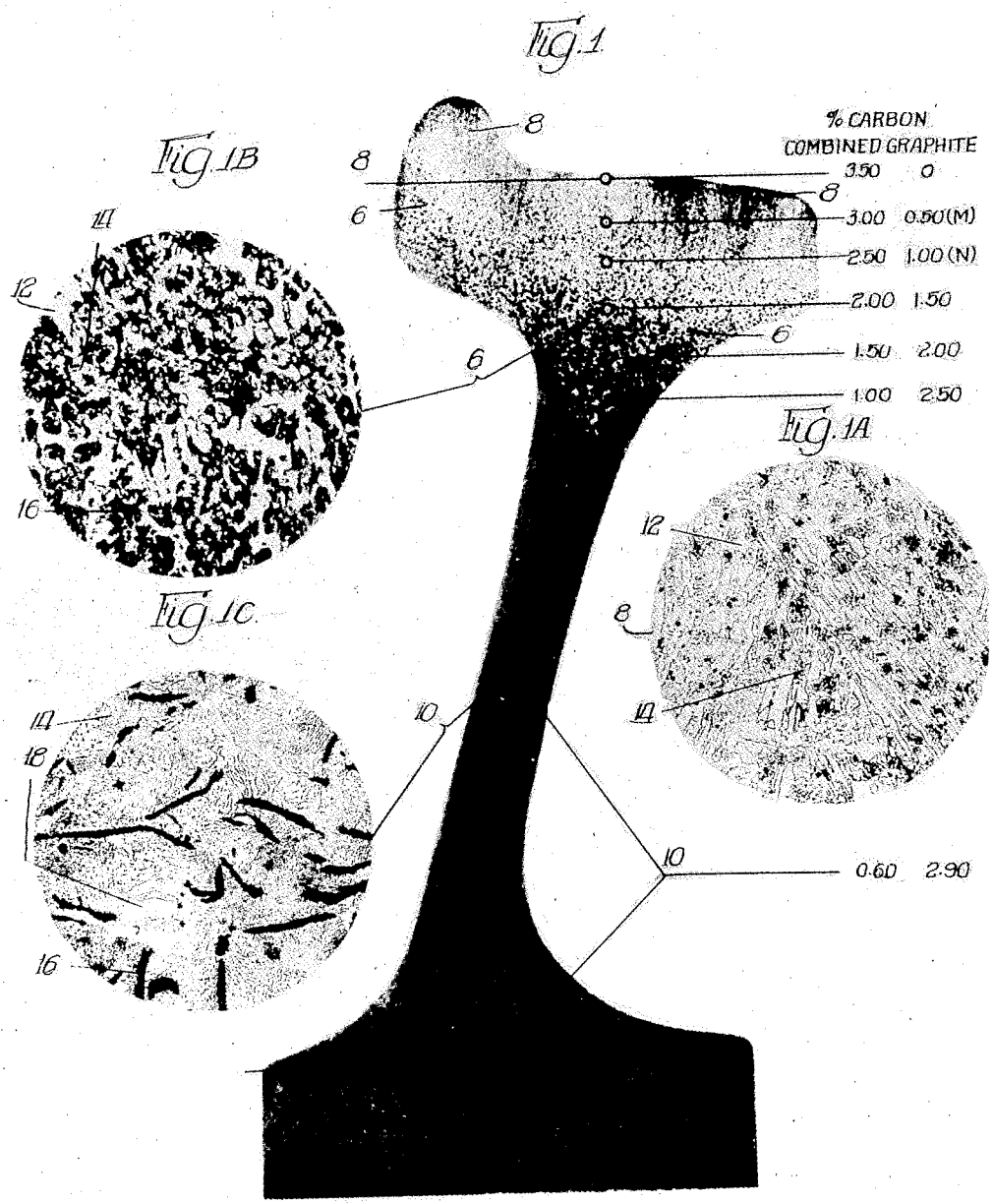
Figure 2:
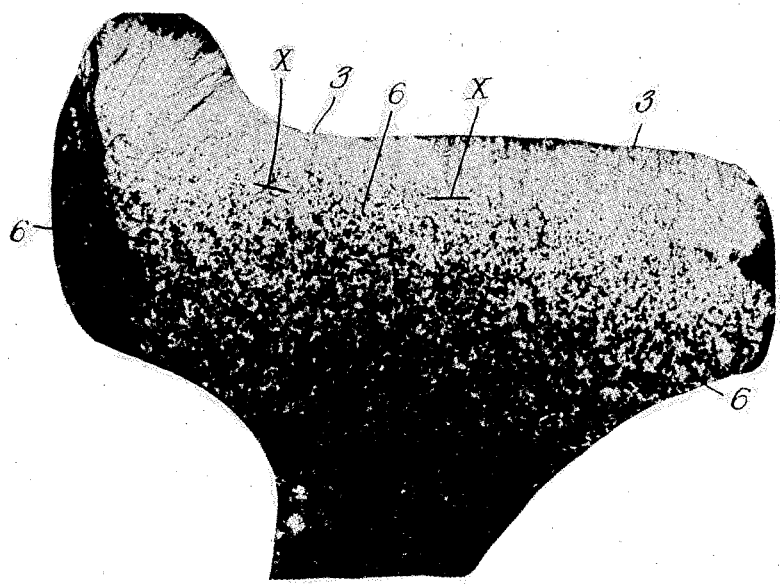
Figure 3:
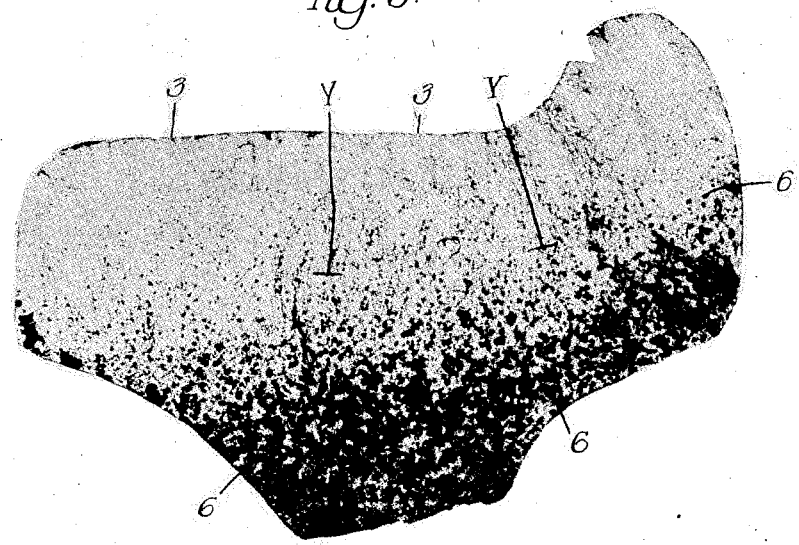

The control of chill as heretofore practiced is based upon the delicate reaction resulting from small variations in the rate of cooling at different depths below the tread surface of the casting. As indicated in Figures 2 and 3, according to present practice the demarcation between the chilled portion and the gray iron portion is not precise, and the mottled iron occupies a fairly wide zone which is an undesirable condition.

In the control of the chilling process there are several factors to be considered:

*First.*—Those elements having an impelling force towards carbide disintegration. These elements are in the periodic group 4, containing: carbon, silicon, titanium, zirconium, tin, and others.

*Second.*—Those elements having an impelling force to oppose carbide disintegration. These are contained in periodic group 6, containing: oxygen, sulphur, chromium, selenium, molybdenum, tellurium.

*Third.*—Those items that are inert with reference to carbide disintegration. These are contained in periodic group 5, containing: nitrogen, phosphorus, vanadium, arsenic, antimony, and others.

*Fourth.*—A variable condition is produced by variations in the occluded gases which are absorbed during the process of melting. These accentuate the uncertainties of chilling properties. This condition is not disclosed by chemical analyses.

*Fifth.*—Time is an important element in the stabilization or the decomposition of the carbide of iron. A rapid rate of cooling promotes carbide stabilization and may completely nullify the forces which promote carbide decomposition. On the other hand very slow cooling may enhance the forces which promote decomposition and nullify the forces which promote stabilization.

*Sixth.*—There are other physical factors which affect the balance of the forces for and against carbide decomposition. The most important of these are the temperature of melting and temperature of pouring. According to the nuclei theory temperature of melting is a very important item in fixing the poverty or the plethora of graphitic nuclei.

The measure of control now employed in the manufacture of chilled car wheels is commonly based upon the action of silicon which favors the disintegration of iron carbide into graphite and ferrite or pure iron. This process is called graphitization.

The present method of determining the desired balance between the variable tendencies is to take a test piece poured against a chiller to determine the depth of chilled metal and the appearance of the mottled iron therein and from experience it is decided whether this depth of chill on the test piece will produce the desired depth of chill in the wheel. If the test piece has more chill than desired, the ladle of molten metal is treated with a small amount of silicon. If the test piece is deficient in chill, the ladle is treated with chromium, which opposes graphitization. Difficulty arises however in estimating the proper amount of treatment, because the amount that the molten metal is out of equilibrium is an uncertain quantity and is not entirely disclosed by the test piece, partly because the section of the metal in the wheel is very different from that in the test piece and the cooling is at a different rate in the two castings, and hence the chill in the wheel is not in proportion to the chill in the test piece, especially when the temperature of pouring varies. This difficulty is well illustrated in Figures 2 and 3 taken from the A. A. R. Wheel and Axle Manual to indicate the method of measuring chill when inspecting the wheel. Beyond this, however, there are many wheels which fail to pass inspection on account of chill depths above and below the minimum.

Under present methods there is no sufficiently definite control of the wide dispersion of carbide of iron and graphite indicated at 6, 6 in Figures 1, 1B, 2 and 3 and described as mottled iron. The impelling forces for and against graphitization are feeble, hence the small variations in the rate of cooling over the zone to be chilled are not sufficient to develop a balance at a definite point, hence a wide band of mottled iron. This wide band of mottled iron representing a mixture of white carbide of iron and black graphitic carbon is detrimental. The sole reason for developing the white carbide of iron is to produce wearing value.

The maximum to which a wheel may be worn is three-eighths of an inch, hence it is only necessary to have a depth of one-half or five-eighths of an inch of white iron to insure that there is sufficient wearing value around the entire circumference of the wheel, and enough mottled iron to securely bond the white iron to the gray iron. All white iron and mottled iron above these requirements is detrimental from the standpoint of resistance to impact.

Figure 4:
Figure 4 is an illustration of a cut through the tread portion of a wheel such as shown in Figures 2 and 3 in which the dendritic structure is emphasized by appropriate direction of lighting showing the elongated crystalline formation of the cementite.
Figure 4A:
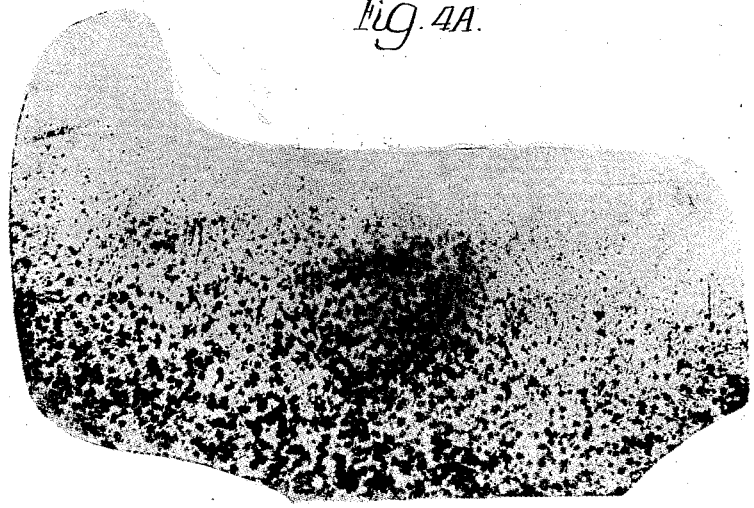
Figure 4A shows the same cut as Figure 4 with the lighting directed to show clearly the mottled effect, and, by comparison with Figure 4, the manner in which the dendrites extend through the mottled iron.

The carbide of iron has running through it what is known as a dendritic structure which is similar to the grain in a piece of wood. These dendrites persist through the mottled portion of the metal as shown in Figures 4 and 4A. This condition is obviously harmful and at times disastrously reduces the strength of the flange and rim.

The degree of graphitization inherent in the iron, which depends upon the many different factors above indicated, controls the extent of the chilled iron and mottled iron in the cast car wheel. This degree of graphitization may change during the pouring of a heat on account of varying amounts of occluded gases, shifting temperatures, and other factors, thus interfering with the predetermined desired chill depth. It is obvious that the section of the casting represented in wheels of different weights and diameters, and chilled castings for other purposes, have different cooling rates at the point where it is desired to have the chilled iron cease and the gray iron begin. It is therefore highly desirable to have a means of control.

It is a principal object of this invention to devise a method of casting a chilled iron product in such manner as to control to an extent heretofore impossible the sensitivity of graphitization to small variations in the cooling rate that exist at various depths in the casting.

A different objective of my invention is to devise a method of producing a chilled cast iron article having a relatively definite zone of demarcation between the chilled iron and the gray iron, said zone being reduced to a minimum width for the purpose already described.

My invention comprehends a method of simultaneously introducing into the molten iron certain balancing elements for and against graphitization, said elements acting in opposite to each other, resulting in a narrow and relatively sharply defined zone of mottled iron between the chilled iron and the gray iron.

A different object of my invention is so to control the marginal and merging portions of the chilled iron and the gray iron in a chilled iron casting as to sharply reduce and limit the length of dendrites or dendritic structure normally formed in the chilled portion in order to prevent the projection thereof through a relatively extended mottled portion which at present is commonly found in such chilled iron castings. Expressed in another manner, an object of my invention is to produce a chilled iron casting wherein the chilled portion merges with the gray iron portion thereof through a relatively narrow band of mottled iron, thus reducing to a minimum the quantity of mottled iron in a given casting, and reducing the length of the dendrites.

The manner in which these various objectives is accomplished is shown by the information set forth in the attached figures together with the descriptive material thereof herein set forth.

The balance of the forces for and against graphitization as above referred to may be accomplished while the molten iron is in the receiving ladle or in the pouring ladle. As already indicated, molten iron does not have the same condition from hour to hour with respect to its chilling tendencies, and these differences of balance in metal of the same chemical analysis are influenced by the type of furnace in which it is melted such as: cupolas, air furnaces, electric induction furnaces, electric arc furnaces, rocking and stationary furnaces, and so forth. Varying quantities of silicon, carbon, calcium, titanium, or other graphitizing agents may be used to bring about an equalized condition between the summation of the two opposing forces. It is very noticeable that the use of an initial small quantity of these elements as ladle treatment produces a far greater effect than subsequent additions; in other words, the effect caused by increasing amounts of these elements as ladle additions is in diminishing return. It is also noted that smaller percentages of these elements are required to produce the balance desired when used as ladle additions than when used as a part of the melting stock charged into the furnace.

Phenomena already referred to indicate that the metal as tapped from a furnace is variable in regard to the balance between the graphitizing forces and graphitization resisting forces. The reason for these variations is not disclosed by ordinary chemical analyses but may be accounted for by variations in the occluded gases such as oxygen and hydrogen, and also the poverty or abundance of nuclei which retard or enhance the decomposition of the carbide of iron.

In the process herein disclosed a powerful deoxidizing agent is used to bring the molten iron to a standard condition in regard to its chilling properties. Silicon, carbide of silicon, silicon-manganese, calcium silicide, alsifer or the like may be used but carbon in any one of its forms is a cheaper and more powerful deoxidizer and at the same time develops graphite nuclei in the molten iron. For illustration, stub carbon electrodes or carbon in a briquette form may be introduced into the ladle where it dissolves slowly and during the lapsed time between receiving the metal into the ladle and pouring it into the mold, one or two ounces may be taken up per ton of metal, hence the electrode or briquette remains in the ladle for successive pourings, giving up to each ladle a sufficient amount of carbon for deoxidation or nucleation. The carbon also may be used in a powdered form. In this later case one-half (½) pound of carbon per ton of iron is sufficient for the purpose of bringing the molten iron to a standard condition.

The balance will always be uncertain if the only ladle addition is in the form of a graphitizing agent, for the extent to which the original metal departs from the desired condition is unknown, hence a small excess of the treating material may throw the metal out of balance in the opposite direction, resulting in an undesired low chill. In order to overcome this difficulty it is necessary to add the graphitizing element in excess at the same time to add to the deoxidized and nucleated iron an element that is a powerful carbide stabilizer, one that inhibits graphitization, in order to neutralize the excess graphitizing force.

It is essential to use in combination with the carbon or other deoxidizing agent an element having the strongest influence towards the stabilization of the carbide of iron and to resist graphitization. By the use of two powerful opposing forces a very decided equilibrium is produced at a definite distance below the surface of the casting, which is fixed by its specific rate of cooling. If the two opposing forces are not balanced for the specific rate of cooling, then an excess graphitizing force will cause a balance at a point having a higher rate of cooling which is nearer the surface of the metal; and if the carbide stabilizing force is in excess the point of balance will be at a line more remote from the surface of the metal where the rate of cooling is slower.

The accelerated rate of cooling in close proximity to the chiller insures a chill depth to a point where the rate of cooling rapidly diminishes. It is also a requisite for ladle treatment that the element which stabilizes the carbide of iron should have a low melting temperature to insure a ready solution in molten iron and also that the boiling temperature shall be sufficiently high to prevent gasification by the heat of the molten iron.

An alloy of metals will melt at a lower temperature than the individual component elements, hence when the melting temperature of an element is very high it can often be used for ladle treatment by first making an alloy with some other metal as for example: ferro-silicon, ferro-chrome, ferro-molybdenum, and so forth.

Referring to the periodic group No. 6, which constitutes the carbide stabilizing elements, the following temperatures of melting and boiling are recorded:

*Hardening elements*

| Element | Symbol | Atomic | | Temperature of— | |
|---|---|---|---|---|---|
| | | No. | Weight | Melting | Boiling |
| Oxygen | O | 8 | 16 | −360 | −300 |
| Sulphur | S | 16 | 32.06 | 240 | 830 |
| Chromium | Cr | 24 | 52.01 | 2,770 | 4,000 |
| Selenium | Se | 34 | 79.2 | 425 | 1,270 |
| Molybdenum | Mo | 42 | 96.0 | 4,530 | |
| Tellurium | Te | 52 | 127.5 | 840 | 2,530 |
| Tungsten | W | 74 | 184.0 | 5,900 | |
| Polonium | Po | 84 | 210.0 | | |
| Uranium | U | 92 | 238.14 | 3,130 | |

From these elements which act to stabilize carbide of iron I have chosen tellurium which is ideal for the purpose herein set forth on account of its high atomic weight, low melting temperature which avoids the necessity of alloying with another metal, and boiling point above the ordinary temperature at which iron is poured into a mold.

Figure 6:
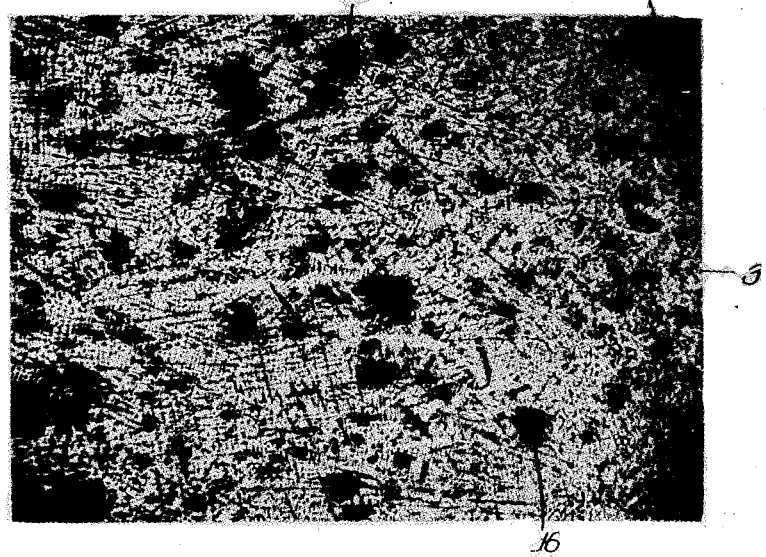
Figure 6 is a macrophotograph of a cut through the chilled tread portion of a wheel made in regular practice and clearly shows the somewhat mottled effect even in the chilled area. The photograph is magnified twelve times and shows approximately the first half inch of the tread surface of a wheel.

In opposing graphitization tellurium has an effect many times more powerful than the other elements of this group having lower atomic weight. I have found that tellurium may be used with carbon as an ideal combination for ladle treatment to produce an intensification of graphitization in the desired gray iron portion of the casting while at the same time insuring a definite depth of chill substantially devoid of graphite at the wearing surface. Figure 6 represents the condition of chilled iron as ordinarily produced at the present time. It indicates that the forces for and against graphitization are feeble and hence the sensitivity of the metal to any small change in the rate of cooling is very low. In this case the carbide disintegration begins at the point having the highest cooling rate immediately at the surface in contact with the chiller as indicated at 3 and the feeble resistance to graphitization results in a wide zone in which the carbide of iron is partially decomposed as indicated by the patches of graphite 16, 16, surrounded by the white carbide of iron. This is very undesirable from all standpoints. In contrast to this is Figure 7 which represents the graphite-tellurium treated iron in which the chill is solid with almost no indication of carbide disintegration. Figure 8 shows a graphite-tellurium treated low chill indicating the relatively sharp line of demarcation between the sound solid chill and the sudden disintegration of carbide which is regulated by a specific rate of cooling at the point of balance.

In this balancing operation as I have described it, the graphitizing agent in the form of graphite stub electrodes or powdered graphite may be added to the molten iron either in the receiving ladle or in the pouring ladle, usually as it is being poured from the receiving ladle to the pouring ladle. As above indicated, I have found an optimum quantity of free powdered graphite to be about one-half pound per ton of metal, and somewhat less if in the form of a briquette or stub graphite electrodes. At the same time an addition of tellurium will be made in order to bring about an equilibrium of all the combination of forces of greater or less intensities toward carbide stability on the one hand and carbide disintegration on the other. This action is very similar to the composition and resolution of mechanical forces by which a resultant force is established to bring a composite of forces into an equilibrium. The amount of tellurium added will depend upon the rate of cooling in the casting at the point where it is desired to have the chill depth cease. The mass of the casting to be chilled modifies the rate of cooling at various depths below the surface hence the amount of tellurium used to effect a balance will depend upon the mass of the casting and the chill depth desired. I have found that the use of one-fourth ounce to one ounce of tellurium per ton of molten metal will give the best results for castings represented by the chilled car wheel group. In other words, if the pouring ladle contains one ton of molten metal an average addition would be one-half pound of powdered graphite and one ounce or less of tellurium added at the bottom of the pouring ladle as the molten iron flows from the receiving ladle. By this means a thorough mixing is obtained.

When the graphitizing agent is constant, slightly more tellurium will be required as the size or the mass of the casting increases. When more graphitizing treatment is used more tellurium will be required for the same casting. The tellurium may be added in a variety of forms, but I have found the elemental metallic form most satisfactory.

The present technique of chill control is based upon relatively slight variations noted in the mottled iron in the test piece. Figure 10 (A, B and C) indicates the range of chill on test pieces from observation of which the test engineer estimates what further treatment may be required for the metal from which the tests were poured in order to produce the desired casting.

In producing chilled castings according to my invention, the test engineer need not rely on his scrutiny of delicate variations of chill on precast test pieces (Figure 10). Instead of such an indefinite measure, he may use as an index test pieces treated with graphite and tellurium (Figure 11) showing a relatively sharp line of demarcation between the chilled metal 8 and the gray iron, said line of demarcation being a narrow band of mottled iron 6.

The great advantages accomplished by my novel method will be clearly apparent to those skilled in the art. Restriction of the dendritic structure to a sharply defined area representing the chilled iron will reduce the tendency of a fracture starting therein to extend therebeyond into the gray iron portion of the wheel. The extension of the gray iron in homogeneous form into the tread portion of the wheel increases the resistance to impact of the wheel structure as a whole and gives to a substantial portion of the rim structure of the wheel that ductility which is normally present in the gray iron. At the same time the mottled area in the wheel is reduced to a minimum and this is a very advantageous condition inasmuch as the mottled structure is generally harmful as representing a mixture of these metals of opposite characteristics without having in adequate degree the virtues of either. Enough of the mottled iron is desired to form a firm bond between the chilled iron and the gray iron. Tests have shown that the relatively thin band of mottled iron produced in a casting made in acordance with my invention forms a structure which is better able to withstand shock and at the same time affords an improved wearing metal in the chilled area.

I claim:

1. A method of controlling and restricting to a predetermined width the band of mottle between the gray iron sand-cast body portion and the metal chilled white iron portion of an iron casting without appreciably affecting the physical properties of either of said portions when the region of said mottle has a cooling rate of less than 100° F. per minute, comprising the steps of providing molten iron having a silicon content of less than one per cent and introducing into said molten iron in a pouring operation a mixture of tellurium and graphite in atomic weight ratio between 1:70 and 1:700, without substantially altering the chill depth which would be produced by casting said iron under the same conditions without adding said mixture.

2. A method of controlling and restricting to a predetermined width the band of mottle between the gray iron sand-cast body portion and the metal chilled white iron portion of an iron casting when the region of said mottle has a cooling rate of less than 100° F. per minute, comprising the steps of providing molten iron having a silicon content of less than one per cent and introducing into said molten iron in a pouring operation a mixture of tellurium and graphite in atomic weight ratio between 1:70 and 1:700, without substantially altering the chill depth which would be produced by casting said iron under the same conditions without adding said mixture.

3. The process set forth in claim 1 in which the total tellurium content is less than three thousandths of one per cent (.003%).

4. The process set forth in claim 2 in which the total tellurium content is less than three thousands of one per cent (.003%).

5. In the manufacture of an iron casting having a gray iron sand-cast portion and a white iron peripheral portion cast against a metal chiller, the process of controlling and restricting the width of the mottled band which normally exists between said portions when said band is in a portion of said casting having a cooling rate less than 100° F. per minute, comprising the steps of providing molten iron of silicon content less than one per cent and introducing into said molten iron in a pouring operation graphite up to one pound per ton and tellurium up to one ounce per ton, without appreciably modifying the depth of chill which would be produced by casting said iron under the same conditions without introducing said graphite and tellurium.

6. The process of claim 5 wherein the tellurium content does not exceed three thousandths of one per cent (.003%).

7. The cast iron product produced by the method of claim 1.

8. The cast iron product produced by the method of claim 2.

9. The cast iron product produced by the method of claim 3.

10. The cast iron product produced by the method of claim 4.

11. The cast iron product produced by the process of claim 5.

12. The cast iron product produced by the process of claim 6.

13. The process of casting a car wheel having a metal chilled white iron tread portion and a gray iron sand-cast body portion with a band of mottled iron between said portions when the region of said mottled iron has a cooling rate of less than 100° F. per minute, including the steps of providing molten iron having a silicon content of less than one per cent and introducing into said molten iron in a pouring operation tellurium in amount effective to maintain the depth of white iron, and graphite in amount effective to reduce the thickness of said mottled band and form a distinct band of gray iron in the section of said wheel, said tellurium and graphite being in atomic weight ratio between 1:70 and 1:700 and said tellurium being in amount less than three thousandths of one per cent (.003%), said process operating to produce a car wheel having a chill depth substantially equal to that which would be produced by casting said iron under the same conditions without introducing said tellurium and graphite.

14. A car wheel cast by the process of claim 13.

FREDERICK K. VIAL.